United States Patent
Tsuchiya et al.

(10) Patent No.: US 7,250,585 B1
(45) Date of Patent: Jul. 31, 2007

(54) ROBOTIC WELDING SYSTEM AND METHOD FOR WELDING PROJECTION WELD NUTS

(75) Inventors: Hiroki Tsuchiya, Dublin, OH (US); Noboru Takahashi, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/421,303

(22) Filed: May 31, 2006

(51) Int. Cl.
    *B23K 11/14* (2006.01)
(52) U.S. Cl. ....................................... 219/93; 219/91.2
(58) Field of Classification Search ............... 219/93, 219/96, 91.2
    See application file for complete search history.

(56) References Cited

U.S. PATENT DOCUMENTS

| | | |
|---|---|---|
| 5,067,763 A | 11/1991 | Aoyama |
| 5,372,279 A | 12/1994 | Aoyama |
| 5,632,912 A | 5/1997 | Cecil |
| 5,705,784 A | 1/1998 | Aoyama et al. |
| 5,808,266 A | 9/1998 | Cecil |
| 6,008,463 A | 12/1999 | Aoyama et al. |
| 6,037,558 A | 3/2000 | Geiermann et al. |
| 6,067,696 A | 5/2000 | Cecil et al. |
| 6,163,004 A | 12/2000 | Aoyama et al. |
| 6,303,893 B1 | 10/2001 | Perks |
| 6,337,456 B1* | 1/2002 | Taniguchi et al. ........ 219/86.25 |
| RE37,607 E | 3/2002 | Cecil |
| 6,576,859 B2* | 6/2003 | Cabanaw ..................... 219/119 |
| 6,607,067 B1 | 8/2003 | Aoyama et al. |
| 6,624,379 B1 | 9/2003 | Thornton et al. |
| 6,653,590 B1 | 11/2003 | Aoyama et al. |
| 6,706,991 B2 | 3/2004 | Aoyama et al. |
| 6,768,082 B2 | 7/2004 | Aoyama et al. |
| 6,875,946 B2 | 4/2005 | Hidaka |
| 2003/0127432 A1 | 7/2003 | Aoyama et al. |

FOREIGN PATENT DOCUMENTS

| | | |
|---|---|---|
| JP | 8057660 A | 3/1996 |
| JP | 9295162 A | 11/1997 |
| JP | 10156549 A | 6/1998 |
| JP | 2003062690 A | 3/2003 |

* cited by examiner

*Primary Examiner*—Len Tran
(74) *Attorney, Agent, or Firm*—Standley Law Group LLP (57) ABSTRACT

A system and method for welding projection weld nuts to a work piece. The system and method of the present invention generally makes use of a fixtured work piece having one or more projection weld nuts associated therewith. A resistance welding robot is used to weld the projection weld nuts to the work piece. The welding robot typically has weld electrodes therewith, through which electric welding current is passed to the projection weld nut(s) and the work piece. A first and second contacting electrode is used to transfer electric current from the welding robot electrodes to the projection weld nut(s) and work piece.

21 Claims, 8 Drawing Sheets

ROBOTIC WELDING SYSTEM AND METHOD FOR WELDING PROJECTION WELD NUTS

BACKGROUND OF THE INVENTION

The present invention is directed to an improved system and method for welding projection weld nuts. More particularly, the present invention is directed to a robotic system and method for welding projection weld nuts.

Projection weld nuts would be well known to one skilled in the art. However, in brief, projection weld nuts are generally threaded nuts designed especially for attachment to a metallic work piece via resistance welding. To facilitate welded attachment, projection weld nuts include several portions of weld material that project outward from a welding face (i.e., the face of the projection weld nut that will contact the work piece). The projection weld nut is placed into contact with a work piece, typically in or over a pilot hole, pressure is preferably applied, and a resistance welding apparatus is used to pass current through the work piece and the projection weld nut. The current causes a melting of the weld material projections and a welding of the projection weld nut to the work piece.

In a typical projection weld nut welding process, a projection weld nut is located to a work piece for welding. The work piece is often maintained in the welding position by hand. Welding is typically accomplished by use of a specialized resistance welding device that includes a pair of electrodes designed to apply pressure to the projection weld nut and work piece and to pass current through the work piece and the projection weld nut. For example, a first electrode may be provided to contact an underside of the work piece while a second electrode is provided to contact the projection weld nut. Each of the electrodes is normally pressed against the work piece by an actuator, such as a hydraulic or pneumatic cylinder.

The problem with such a system is that it requires specialized equipment unique to the work piece at issue, and also commonly necessitates much handling by an operator. Applicant is unaware of any existing system or process for attaching projection welding nuts to a work piece using a common resistance (e.g., spot) welding robot. The ability to weld projection weld nuts using a resistance welding robot would, therefore, be desirable—as such a robot can be easily adapted for use with work pieces of varying size and/or shape, thereby obviating the need for a specialized resistance welding apparatus and also minimizing operator handling.

The present invention is such a system and process. That is, the present invention is directed to a system and process for welding projection welding nuts, whereby the welding process is accomplished using a resistance welding robot.

SUMMARY OF THE INVENTION

The present invention generally comprises a robotic resistance welding robot in combination with a work piece fixture for supporting a work piece, and one or more pairs of contacting electrodes for transferring electric current from the welding robot to the projection nut(s) and work piece. The present invention allows for the elimination of, or a reduction in, work piece handling on the part of an operator. The system and process of the present invention also permits the welding of projection weld nuts to a wide variety of work pieces without the need to design and construct complex dedicated welding devices. Rather, a single welding robot in combination with one or more simple fixtures can be used to accomplish the welding of projection weld nuts to a wide variety of work pieces.

In one embodiment of the present invention, a resistance welding robot having a pair of moveable gun arms is used to effectuate welding. The welding robot is used in conjunction with a fixture for properly supporting the work piece of interest, and a first and second contacting electrode for transferring electric current from the welding robot to the projection nut(s) and work piece. The welding robot may be, for example, a typical spot welding robot equipped with common or specially adapted weld electrodes, and preferably capable of applying pressure to the projection weld nut(s) and work piece prior to the transfer of electric current thereto. In another embodiment, the welding robot may have a single gun arm that is used in conjunction with a moving weld electrode to effectuate welding.

The work piece fixture may include a support bracket or other support structure that also houses a first contacting electrode. The first contacting electrode is adapted for contact by a first weld electrode of the welding robot, and to transfer current therefrom to the work piece and projection weld nut. The first contacting electrode may be of various designs, but preferably contacts a surface of the work piece in the area of the projection weld nut. The first contacting electrode may also include one or more elements to help fix the position of a projection weld nut.

An electrode mounting member may also be provided to locate and support a second contacting electrode. The electrode mounting member can be stationary or moveable. In one embodiment, the electrode mounting member pivots in order to clear the work piece as it is moved into proper welding position. The electrode mounting member includes the second contacting electrode. The second contacting electrode is adapted to mate with a second weld electrode of the welding robot, and to transfer current therefrom to the work piece and projection weld nut. The second contacting electrode also preferably acts to press the projection weld nut to the work piece upon contact by the second welding robot electrode. For example, the second contacting electrode may be a slidable assembly that moves within the electrode mounting member when contacted by the second electrode of the welding robot.

Operation of such an exemplary embodiment of a system of the present invention may include: placing a work piece on the fixture; locating one or more projection weld nuts to the work piece; moving the fixtured work piece into proper welding position; and using the gun arms and associated weld electrodes of a resistance welding robot to press the projection weld nut(s) to the work piece and to weld the projection weld nut(s) thereto. In certain embodiments of the present invention, the work piece fixture may be stationary, while in other embodiments the work piece fixture may shuttle or otherwise transport the work piece to a welding position. The electrode mounting member and second contacting electrode carried thereby may be similarly stationary or moveable. Other embodiments are also possible, some of which are discussed below.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
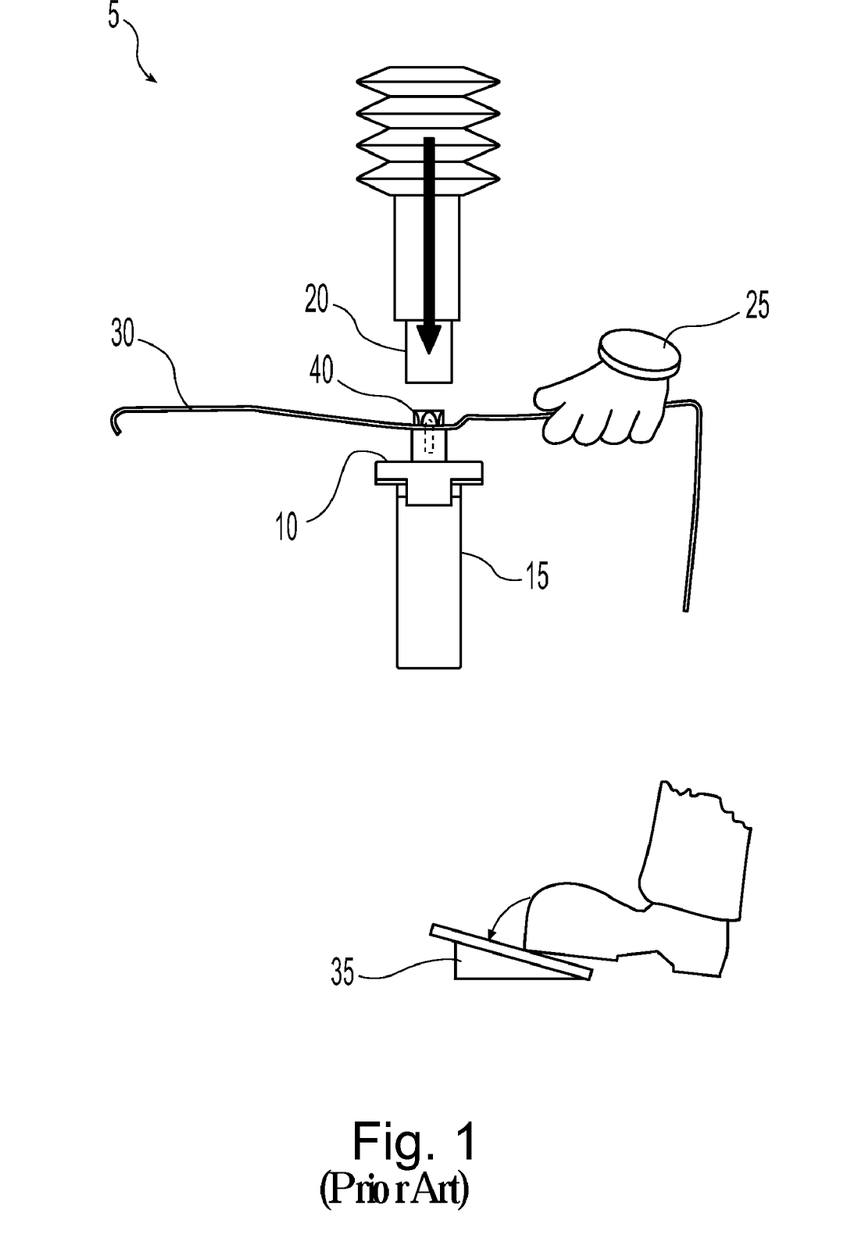
FIG. 1 represents a typical prior art system for welding a projection weld nut to a metallic work piece, wherein an operator is required to hold the work piece to a dedicated welding apparatus.

As can be understood from a review of FIG. 1, known systems for welding projection weld nuts typically require considerable interaction by an operator, as well as dedicated equipment designed for a particular application. As shown, this known welding system 5 includes a fixed lower electrode 10 and support 15, and a vertically displaceable upper electrode 20. Generally, these components will be a part of a specialized resistance welding apparatus. Such an apparatus is generally designed for use specifically with a particular work piece. Consequently, such an apparatus often cannot be adapted, at least not economically, for use with a different work piece.

As can also be observed in FIG. 1, an operator 25 is often required to hold or otherwise manually support a work piece 30 in a proper welding position. With the work piece held in proper position, the operator 25 then typically initiates the welding process, such as by depressing a footswitch 35 or by activating some other suitable process initiating device. Welding is then normally accomplished by advancing one or both weld electrodes (by advancing the upper electrode 20 in the system shown) to press against the projection nut 40 and subsequently passing electric current through the projection nut and work piece 30 using the weld electrodes 10, 20.

A welding system and method of the present invention is designed to simplify the welding of projection nuts to a work piece, and also to allow such a system to be easily and economically adapted for use with dissimilar work pieces. A system of the present invention generally includes a work piece fixture for supporting a work piece without assistance from an operator, a first and second contacting electrode, and a resistance welding robot having a pair of gun arms and associated weld electrodes. In another embodiment, the welding robot may employ a single gun arm and associated electrode in combination with a fixed or displaceable second electrode mounted other than typically to a gun arm. The first and second contacting electrodes are provided to transfer electric current from the welding robot electrodes to the projection weld nut(s) and the work piece.

Figure 2:
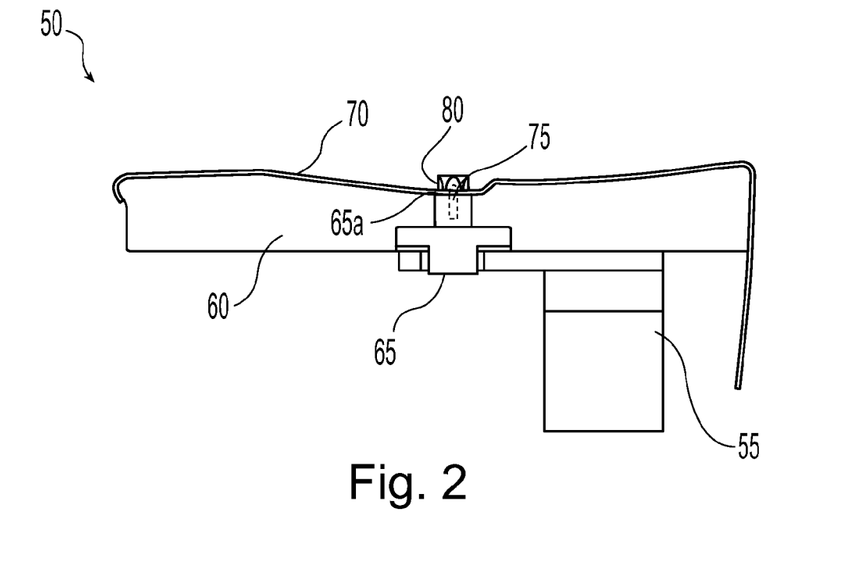
FIG. 2 illustrates a work piece arranged on one exemplary embodiment of a work piece fixture of the present invention such that a projection weld nut will be welded to an outer surface of the work piece.

One exemplary and simplistic embodiment of a work piece fixture 50 of the present invention is depicted in FIG. 2. As shown, this work piece fixture 50 generally includes a support bracket 55 or other supporting structure, a work piece nest 60 that mates to and supports a work piece 70, and a first contacting electrode 65. The work piece fixture 50 is shown in simplistic form for clarity, but it should be understood by one skilled in the art that a work piece fixture according to the present invention can be of virtually any design necessary to properly support and locate a work piece of interest.

In this embodiment, the first contacting electrode 65 extends upward from the support bracket 55 and through the work piece nest 60. A portion of the first contacting electrode 65 also extends through the work piece nest 60 so as to make contact with an underside of the work piece 70 when the work piece is properly located on the work piece nest. A portion of the first contacting electrode 65 also preferably extends through a bottom surface of the support bracket 55 so that it may be contacted by an electrode associated with a resistance welding robot.

The first contacting electrode 65 may be provided with a locating pin 75 or similar element for assisting with the location and retention of the work piece 70 and/or a projection weld nut 80. The locating pin 75 may be installed to the first contacting electrode 65 by any known means, such as by threaded engagement. As shown, the locating pin 75 may also have a tapered distal end so as to facilitate its entry to a work piece aperture and/or a projection weld nut.

In the arrangement shown in FIG. 2, the projection weld nut 80 is to be welded to an exterior (top) surface of the work piece 70. As such, the locating pin 75 extends through the work piece 70 and into the projection weld nut 80, while a top surface of the first contacting electrode 65 contacts an interior surface (underside) of the work piece. In this manner, electric current can be transferred from a resistance welding robot electrode to the work piece 70 and the projection weld nut 80.

Figure 3:
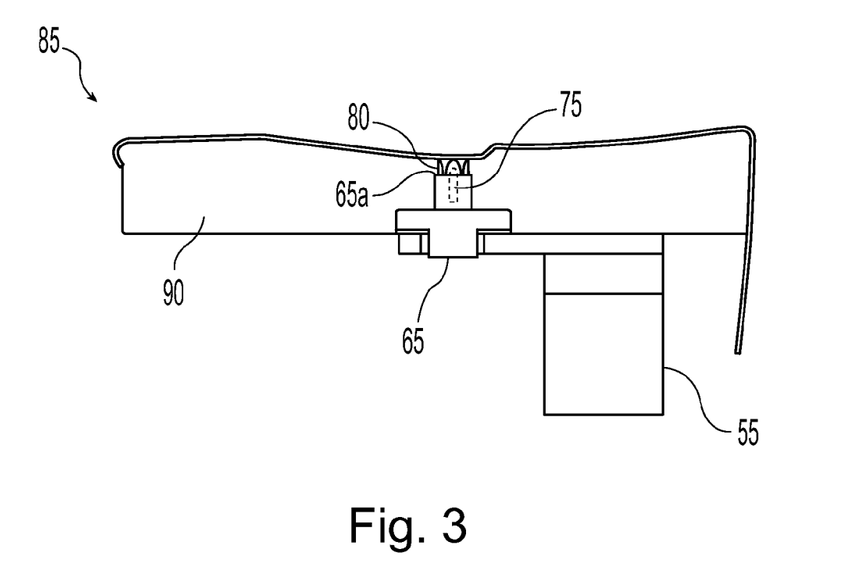
FIG. 3 illustrates a work piece arranged on a work piece fixture similar to that of FIG. 2 such that a projection weld nut will be welded to an inner surface of the work piece.

A slightly different work piece fixture 85 is depicted in FIG. 3. In this embodiment, the support bracket 55 and first contacting electrode 65 of FIG. 2 are again present, but a work piece nest 90 is provided that allows the projection nut 80 to be located beneath the work piece 70 and to be welded to the underside thereof. As such, the projection weld nut 80 also resides in a position that is inverted with respect to that shown in FIG. 2. The locating pin 75 may again be employed to properly locate and retain the projection weld nut 80 during welding. In this embodiment, the top surface of the first contacting electrode 65 is preferably in direct contact with the projection weld nut 80, as opposed to the underside of the work piece 70.

As stated, the primary purpose of the first contacting electrode 65 is to transfer electric current from a resistance welding robot electrode to the work piece 70 and the projection weld nut 80. Consequently, although a particular embodiment of a first contacting electrode 65 is shown herein for purposes of illustration, a first contacting electrode of the present invention is not limited to the particular design shown. Rather, a first contacting electrode of the present invention can be of virtually any design that fulfills the stated purpose.

Figure 4:
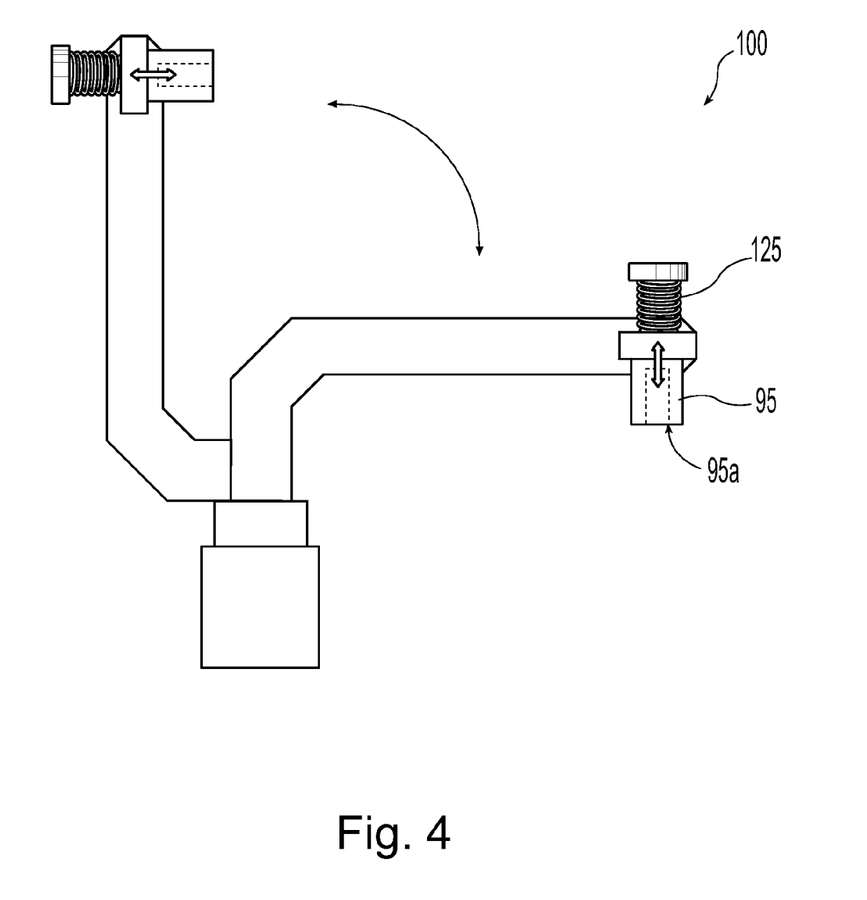
FIG. 4 shows one exemplary embodiment of an electrode mounting member and a contacting electrode of the present invention, which can be used in conjunction with a welding robot and work piece fixture such as that shown in FIGS. 2-3 to weld a projection nut to a work piece.

A second contacting electrode 95 is shown affixed to an electrode mounting member 100 in FIG. 4. As with the first contacting electrode 65, the primary purpose of the second contacting electrode 95 is to transfer electric current from a resistance welding robot electrode to the work piece 70 and the projection weld nut 80. The second contacting electrode 95 may be mounted to an electrode mounting member 100, as shown, or may be mounted in another manner. In this case, the electrode mounting member 100 is rotatable to provide clearance while the fixtured work piece is moved into position. In other embodiments, a fixed second contacting electrode 95 mounting may be employed. Obviously, depending on the work piece of interest, and its orientation, a second contacting electrode of the present invention may also be supported and located in various other ways, may be stationary, or may be linearly and/or rotationally displaceable.

Figure 5A:
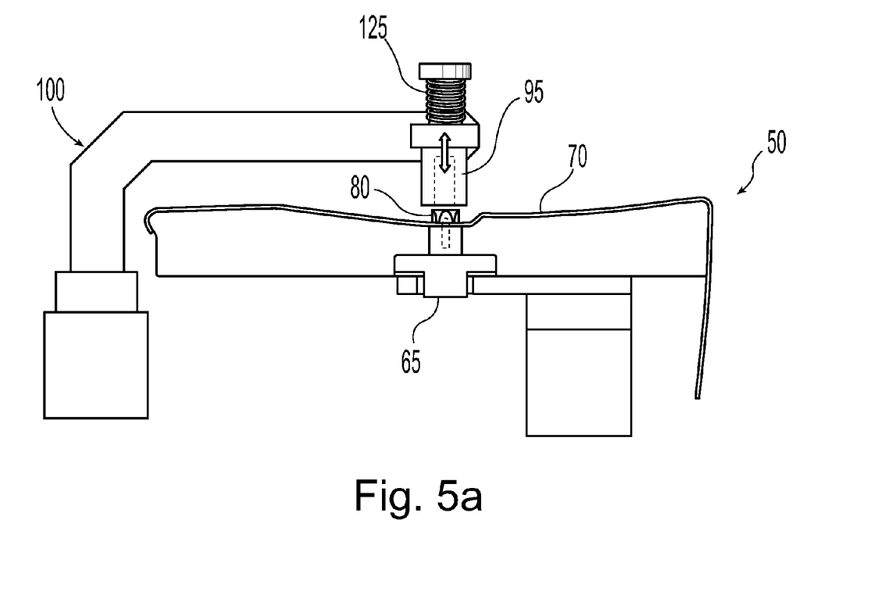
FIG. 5a depicts the work piece and work piece fixture of FIG. 2 properly positioned for welding with respect to the electrode mounting member and contacting electrode of FIG. 4.
Figure 5B:
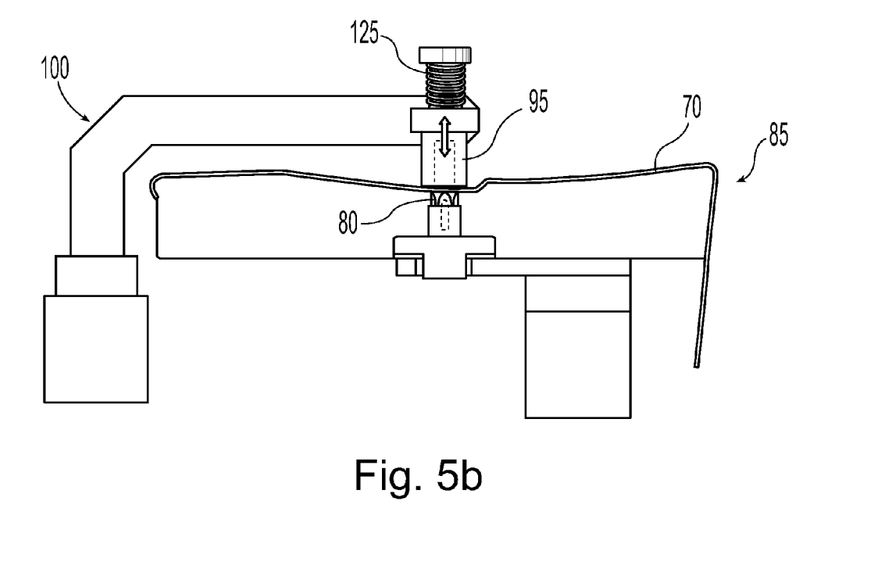
FIG. 5b depicts the work piece and work piece fixture of FIG. 3 properly positioned for welding with respect to the electrode mounting member and contacting electrode of FIG. 4.

In FIGS. 5*a*-5*b*, the fixtured work piece 70 of FIG. 2 and FIG. 3, respectively, is shown after being moved into a welding position. As such, the fixtured work piece 70 is moved into a position where it can also be acted upon by the second contacting electrode 95. In an alternative embodiment, the work piece fixture 50 may be stationary, and the second contacting electrode 95 may be moved into proper position with respect to the work piece 70.

As can be observed, the second contacting electrode 95 is located such that it can transfer electric current from a resistance welding robot electrode to the work piece 70 and the projection weld nut 80 during the welding operation. Generally, the second contacting electrode 95 is therefore substantially aligned with the first contacting electrode 65 when both electrodes are in a proper welding position.

Prior to contact by a welding robot electrode, the second contacting electrode 95 may be placed into contact with a projection weld nut or work piece or, as is shown in FIGS. 5*a* and 5*b*, may assume a position that is in close proximity to the projection weld nut 80 or work piece 70. In the former case, contact may be achieved by rotating or otherwise moving the second contacting electrode 95 into position against the projection weld nut or work piece—such as by means of the rotatable electrode mounting member 100. In the latter, and illustrated, case, the second contacting electrode 95 may be adapted for eventual movement against the projection weld nut or work piece, such as through contact by a welding robot electrode.

In the exemplary embodiments shown, the second contacting electrode 95 resides near, but does not actually contact the projection weld nut 80 or work piece 70 prior to its contact by a welding robot electrode. In this manner, a more controlled contacting of the second contacting electrode 95 with the projection weld nut 80 (see FIG. 5*a*) or the work piece 70 (see FIG. 5*b*) can be assured.

Figure 6A:
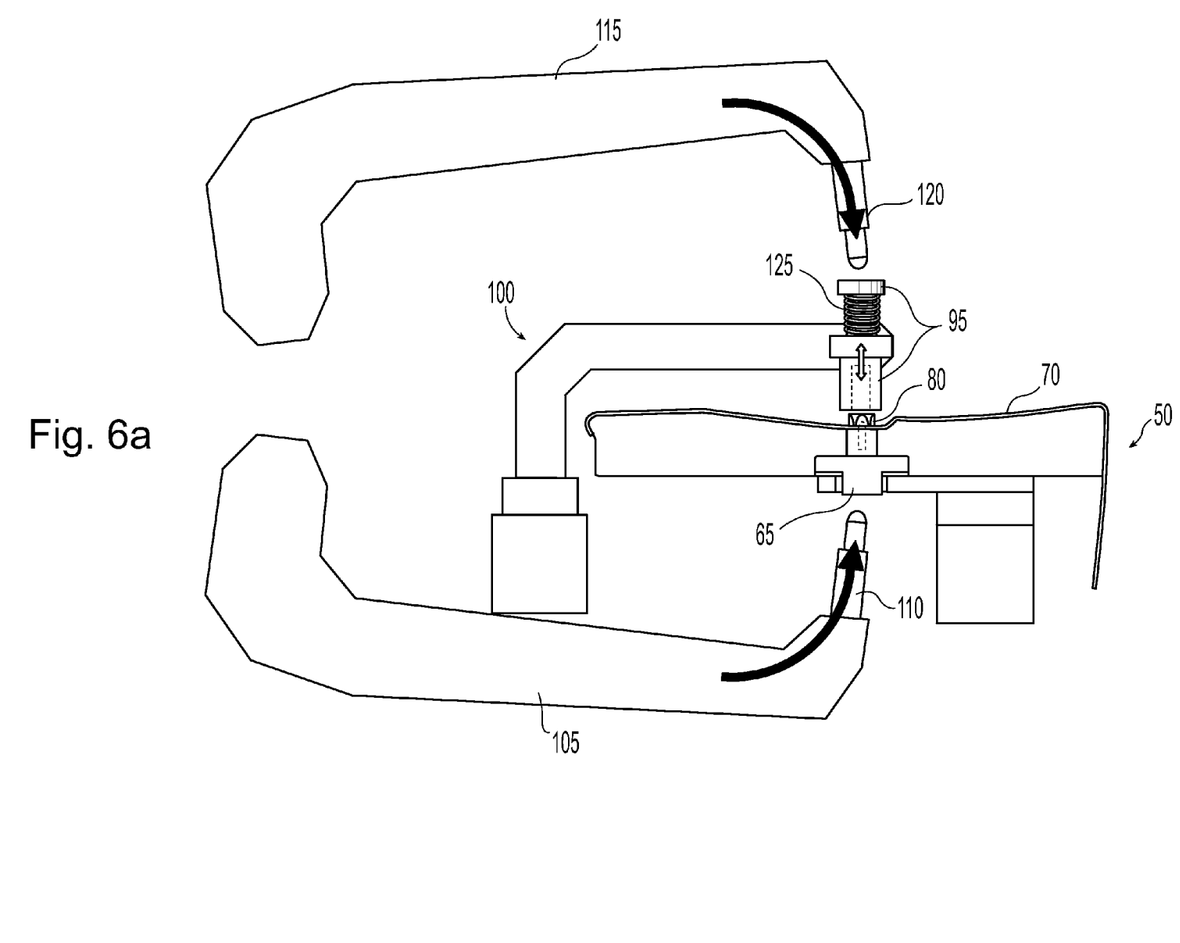
FIG. 6a shows the gun arms and weld electrodes of a typical resistance welding robot properly located in a pre-welding position with respect to the arrangement of FIG. 5.
Figure 6B:
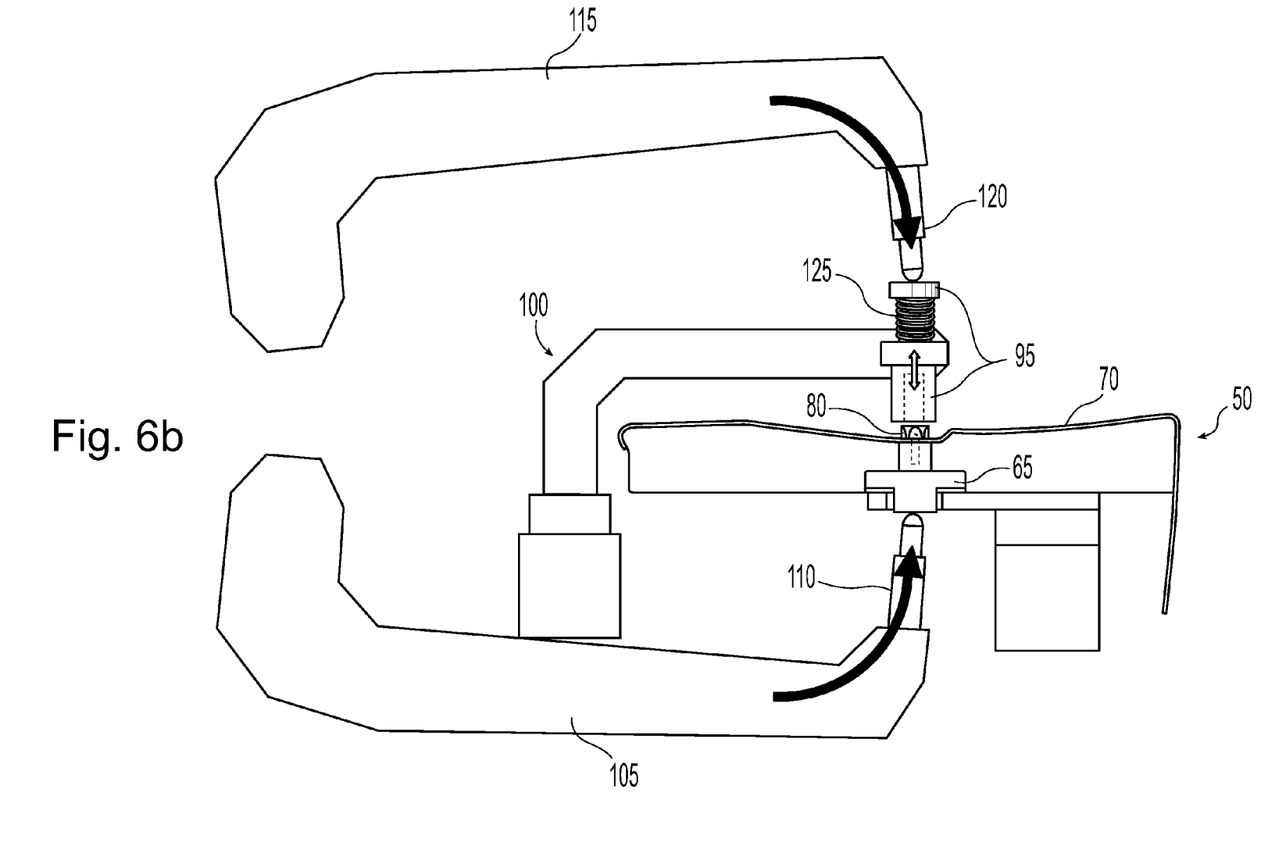
FIG. 6b shows the gun arms and weld electrodes of FIG. 6a located in a welding position.

As can be understood by reference to FIGS. 6*a*-6*b*, welding of the projection nut 80 to the work piece 70 is accomplished according to one particular embodiment of the present invention by contacting the first and second contacting electrodes 65, 95 with corresponding electrodes 110, 120 present on a pair of welding robot gun arms 105, 115. Although not shown herein, one skilled in the art would clearly understand that the gun arms 105, 115 may be attached to a typical resistance welding robot.

Use of a resistance welding robot allows the gun arm electrodes 110, 120 to be moved into position from a variety of angles, thereby ensuring proper clearance with respect to the work piece fixture 50 and the electrode mounting member 100 or one or more similar structures. As can be observed, once properly positioned with respect to the first and second contacting electrodes 65, 95 (see FIG. 6*a*), the gun arms 105, 115 are rotated toward a welding position (see FIG. 6*b*). More specifically, the gun arms 105, 115 are moved toward a closed position such that the first gun arm electrode 110 contacts the first contacting electrode 65 and the second gun arm electrode 120 contacts the second contacting electrode 95.

As the first contacting electrode 65 is in a fixed position in the support bracket 55, no movement is imparted thereto by the first gun arm electrode 110. However, as the second contacting electrode 95 is specifically designed to be displaceable, the second contacting electrode is moved by the second gun arm electrode 120 into a welding position against the projection weld nut 80. This also presses the projection nut 80 tightly against the work piece 70, which generally improves the welding process.

To this end, the second contacting electrode 95 associated with this particular embodiment of a robotic welding system of the present invention is adapted for vertical displacement within the electrode mounting member 100 (and with respect to the projection weld nut 80 and work piece 70). More specifically, the second contacting electrode 95 extends through the electrode mounting member 100 and is slidably moveable therein. In this case, a portion of the second contacting electrode 95 extends upward for contact with the second gun arm electrode 120, while another portion thereof extends downward to contact the projection weld nut 80 or work piece 70.

In this particular embodiment, the second contacting electrode 95 is also provided with a spring 125 for biasing the second contacting electrode away from the projection weld nut 80 or work piece 70. The spring 125 is trapped between a portion of the electrode mounting member 100 and a flared end of the second contacting electrode 95. It can be understood, therefore, that this construction allows the second contacting electrode 95 to be displaced against the projection weld nut 80 or work piece 70 by the second gun arm electrode 120, while automatically returning the second contacting electrode to its normal position upon completion of welding and withdrawal of the welding robot. Obviously, this feature can also be accomplished by means of other designs, and the present invention is in no way limited to the use of a spring-loaded second contacting electrode 95.

The first and second contacting electrodes 65, 95 may each have a solid contacting surface 65*a*, 95*a* to which the corresponding welding robot electrodes 110, 120 may be abutted. Alternatively, one or both of the first and second contacting electrodes 65, 95 may include an aperture (not shown) for receiving at least a portion of a corresponding welding robot electrode 110, 120.

In operation, the welding process associated with the welding system shown in FIGS. 6*a*-6*b* typically begins with the loading of the work piece 70 onto the work piece fixture 50. In the illustrated embodiment, the work piece 70 is loaded into/onto the work piece nest 60 associated with the work piece fixture 50. As shown in FIGS. 6*a*-6*b*, the work piece 70 is a vehicle trunk skin, but could obviously be any type of weldable work piece arranged in virtually any position. Once the work piece 70 has been properly loaded to the work piece fixture 50, the projection weld nut(s) 80 are properly located in their welding positions. The locating pin(s) 75 (described above) or a similar element(s) is provided to ensure the proper location of the projection weld nut(s) 80.

Once the projection weld nut(s) 80 has been located to the work piece 70, the work piece fixture 50 along with the first contacting electrode 65 are moved into proper welding position with respect to the electrode mounting member 100 and second contacting electrode 95 or, in an alternative embodiment, the electrode mounting member and second contacting electrode may be moved into proper welding position with respect to the work piece fixture and the first contacting electrode. This movement may be accomplished by any number of mechanisms that would be familiar to one skilled in the art, and need not be described in detail herein.

With the first and second contacting electrodes 65, 95 in proper welding position, the welding robot is advanced toward the work piece 70 with the gun arms 105, 115 in a deactivated position (although it should be realized that movement of the welding robot may actually start earlier in order to reduce cycle time). The welding robot gun arms 105, 115 are positioned such that the electrodes 110, 120 associated therewith are aligned with the corresponding first and second contacting electrodes 65, 95. Activation (closing) of the gun arms 105, 115 subsequently results in the gun arm electrodes 110, 120 contacting the first and second contacting electrodes 65, 95, with the second gun arm electrode 120 forcing the second contacting electrode 95 into contact with the projection weld nut 80.

With the gun arm electrodes 110, 120 in contact with the first and second contacting electrodes 65, 95 and the first and second contacting electrodes in contact with the work piece 70 and projection weld nut 80, electric current is then passed from the gun arm electrodes through the projection nut and work piece. The electric current is sufficient to melt the material projections of the projection weld nut 80 and to weld the projection weld nut to the work piece 70. If other projection weld nuts are present on the work piece 70, the welding robot moves sequentially therebetween repeating the described welding process. Once welding of all projection nuts is complete, the welding robot is preferably withdrawn to a waiting (home) position and the fixtured work piece 70 is moved to a location for removal by an operator (or a robot). A new welding cycle can then be initiated.

Figure 7A:
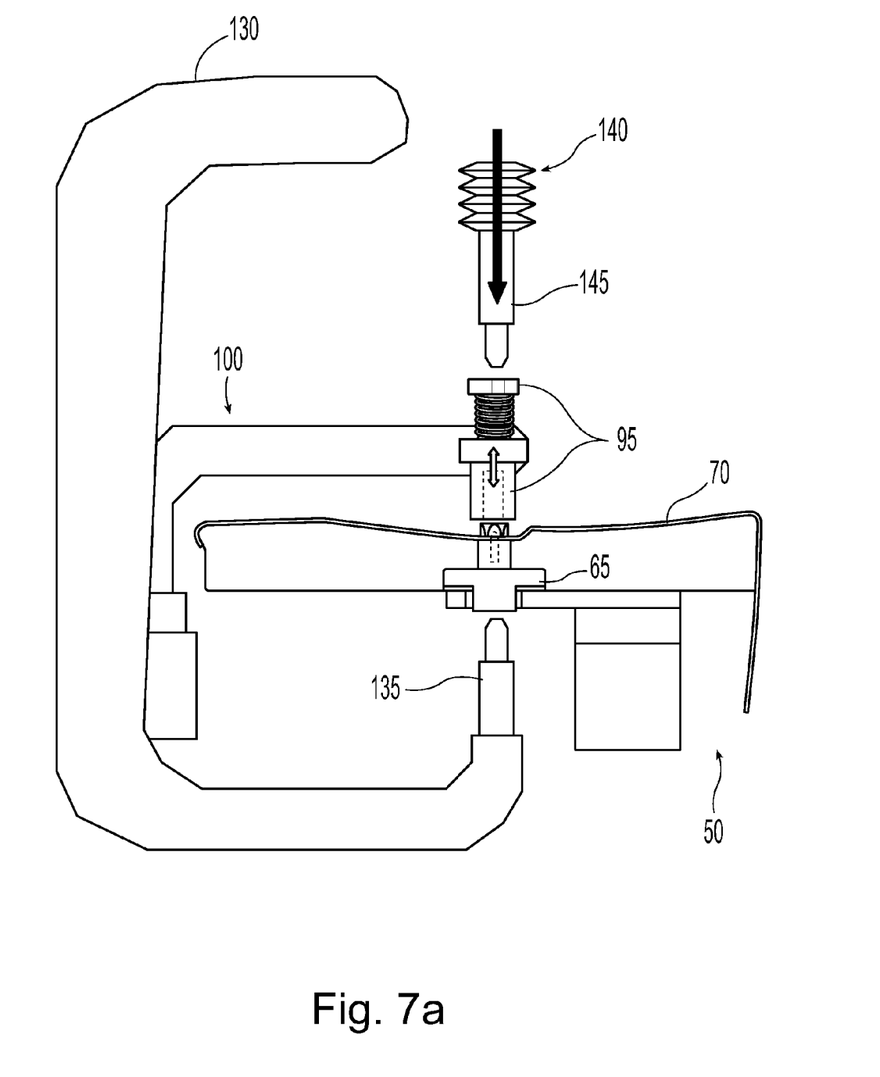
FIG. 7a illustrates an alternate embodiment of a resistance welding robot having a fixed or rigid gun arm in combination with a moving weld electrode, and properly located in a pre-welding position with respect to the arrangement of FIG. 5.
Figure 7B:
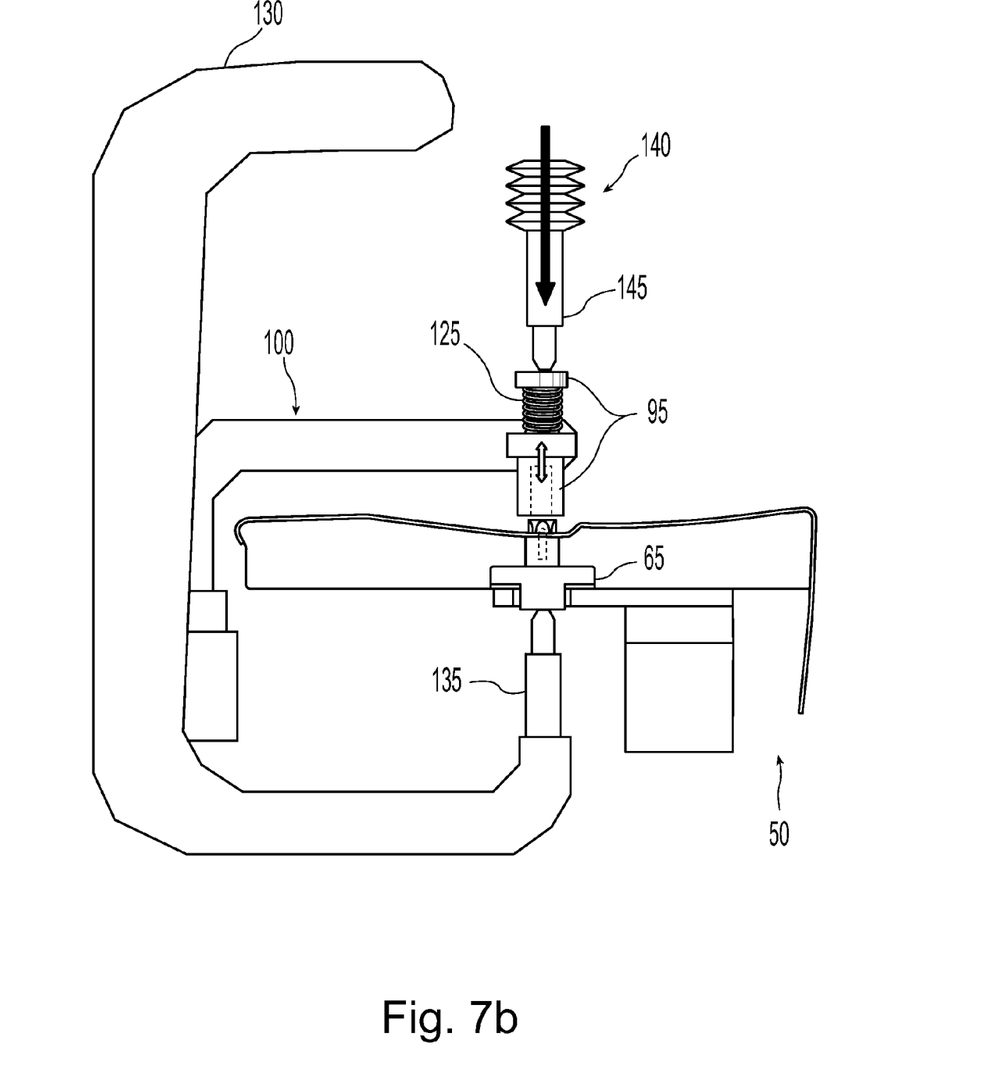
FIG. 7b shows the fixed or rigid gun arm and moving weld electrode of FIG. 7a in a welding position.

An alternative embodiment of a welding system according to the present invention is illustrated in FIGS. 7a-7b. The welding process associated with the particular welding system shown in FIGS. 7a-7b typically progresses in the same manner(s) as that described above with respect to the system of FIGS. 6a-6b.

In this embodiment, however, only a first rotatable or non-rotatable welding robot gun arm 130 and an associated gun arm electrode 135 are present. Instead of a second gun arm for carrying and positioning a second welding electrode, this embodiment of the present invention makes use of a separate welding device 140. As shown, for example, the device 140 may be a linearly displaceable mechanism that retains and positions a second welding device electrode 145. Such a device may be mounted to the welding robot gun arm 130, as shown, or may be attached to a another mounting member that moves with the welding robot. It should also be realized that the position of the gun arm 130 and its associated electrode 135, and the welding device 140 and its associated electrode 145 may be reversed—with the gun arm electrode approaching the work piece 70 from the opposite side of that shown. The electric transferred through the welding device 140 and second contacting electrode 95 may be supplied by the welding robot welding power source, or a different welding power source.

In any event, the gun arm electrode 135 and welding device electrode 145 are placed into proper welding position by advancing the work piece fixture 50 and the welding robot. The welding robot gun arm 130 and welding device 140 are positioned such that the electrodes 135, 145 associated therewith are aligned with the corresponding first and second contacting electrodes 65, 95. Further advancement of the gun arm 130 and welding device 140 subsequently results in the respective electrodes 135, 145 thereof contacting the first and second contacting electrodes 65, 95, with the second welding electrode 145 forcing the second contacting electrode 95 into contact with the projection weld nut 80 and applying pressure to the weld nut and work piece.

With the gun arm electrode 135 and second welding electrode 145 in contact with the first and second contacting electrodes 65, 95 and the first and second contacting electrodes in contact with the work piece 70 and projection weld nut 80, electric current is then passed from the gun arm and welding device electrodes through the projection nut and work piece. The electric current is sufficient to melt the material projections of the projection weld nut 80 and to weld the projection weld nut to the work piece. If other projection weld nuts are present on the work piece 70, the welding robot and welding device may move therebetween repeating the described welding process. In another embodiment, a plurality of welding devices may associated with the welding process of a single work piece. Once welding of all projection nuts is complete, the welding robot and welding device(s) are preferably withdrawn to a waiting (home) position and the fixtured work piece 70 is moved to a location for removal by an operator (or a robot). A new welding cycle can then be initiated.

The systems and methods described with respect to FIGS. 6a-6b and 7a-7b, or systems and methods substantially similar thereto, may also be used to weld a projection nut to an underside of the work piece 70 as depicted in FIG. 3. In such a case, the first contacting electrode contacts the projection nut 80, while the second contacting electrode contacts the work piece 70.

It is to be understood that loading and unloading of a work piece may be accomplished manually, robotically, or some combination thereof. If loading and/or unloading of the work piece is to be performed robotically, the robot used can be the welding robot, or it can be a separate robot.

In contrast to the embodiments shown in the drawing figures and described above, the first contacting electrode may be separate from the work piece fixture. For example, the first contacting electrode may be moved into position much like the second contacting electrode in certain of the previously described exemplary embodiments. When necessary, an aperture or other point of access may be provided in a work piece nest to allow for entry of a moveable first contacting electrode.

Although the present invention has been specifically explained with respect to certain exemplary embodiments where the welding of only one projection weld nut is shown and described, it should be understood by one skilled in the art that a system and method of the present invention can also be used to weld a plurality of projection weld nuts to a work piece. In such a case, a single resistance welding robot may be used to make contact with a number of first and second contacting electrodes. Dedicated first and second contacting electrodes may be provided for each projection weld nut present. In this case, the welding robot simply proceeds from projection nut to projection nut until welding is completed. Alternatively, moveable first and/or second contacting electrodes may be employed to minimize the number of such electrodes required. In this case, at least certain of the first and/or second contacting electrodes may also move from one projection weld nut to another along with the welding robot. Other variations are also possible.

From the foregoing description, it can be understood that there are various ways to construct such a projection nut welding system while still falling within the scope of the present invention. As such, while certain embodiments of the present invention are described in detail above, the scope of the invention is not to be considered limited by such disclosure, and modifications are possible without departing from the spirit of the invention as evidenced by the following claims:

What is claimed is:

1. A system for welding a projection weld nut to a work piece, comprising:
   a work piece fixture for supporting said work piece during welding;
   a first contacting electrode for transferring electric current to said work piece and said projection weld nut from a first side of said work piece;
   a second contacting electrode for transferring electric current to said work piece and said projection weld nut from a second side of said work piece; and
   a resistance welding robot having a pair of gun arms each possessing a weld electrode, said gun arms adapted to press each weld electrode against a corresponding one of said first and second contacting electrodes, thereby applying pressure to said projection weld nut and said work piece;
   wherein said welding robot weld electrodes thereafter transfer electric current to said projection weld nut and said work piece via said first and second contacting electrodes, thereby effecting welding of said projection weld nut to said work piece.

2. The system of claim 1, wherein said first contacting electrode is a part of said work piece fixture.

3. The system of claim 2, wherein said work piece fixture is moveable to a welding position after being loaded with a work piece.

4. The system of claim 1, wherein said second contacting electrode is supported by an electrode support member that locates said second contacting electrode in a proper welding position.

5. The system of claim 1, wherein said electrode support member is moveable.

6. The system of claim 1, further comprising a locating element for properly locating said projection weld nut and/or said work piece.

7. The system of claim 6, wherein said locating element is associated with said first contacting electrode.

8. The system of claim 1, wherein said second contacting electrode is adapted to be pressed against said projection weld nut or said work piece upon contact by a corresponding welding robot weld electrode.

9. The system of claim 8, wherein said second contacting electrode is spring loaded.

10. A system for welding one or more projection weld nuts to a work piece, comprising:
    a work piece fixture for supporting said work piece during welding;
    one or more first contacting electrodes affixed to said work piece fixture and provided to transfer electric current to said work piece and said one or more projection weld nuts from a first side of said work piece;
    one or more second contacting electrodes affixed to one or more electrode mounting members, said second contacting electrodes located separately from said work piece fixture and provided to transfer electric current to said work piece and said one or more projection weld nuts from a second side of said work piece;
    a resistance welding robot having a pair of gun arms each possessing a weld electrode, said gun arms adapted to simultaneously contact corresponding pairs of said first and second contacting electrodes with said weld electrodes and to apply pressure against said projection weld nut and said work piece;
    wherein said weld electrodes of said welding robot transfer electric current to said one or more projection weld nuts and said work piece via said first and second contacting electrodes, thereby effecting welding of said one or more projection weld nuts to said work piece.

11. The system of claim 10, wherein said work piece fixture is moveable to a welding position after being loaded with a work piece.

12. The system of claim 10, wherein said electrode support member is moveable.

13. The system of claim 10, further comprising one or more locating elements for properly locating said one or more projection weld nuts and/or said work piece.

14. The system of claim 13, wherein a locating element is associated with said one or more first contacting electrodes.

15. The system of claim 10, wherein said one or more second contacting electrodes is adapted to be movably pressed against said one or more projection weld nuts or said work piece upon contact by a corresponding welding robot weld electrode.

16. The system of claim 15, wherein said one or more second contacting electrodes is spring loaded.

17. A method of welding one or more projection weld nuts to a work piece, comprising:
    providing a work piece fixture for supporting said work piece during welding;
    affixing one or more first contacting electrodes to said work piece fixture, said first contacting electrodes provided to transfer electric current to said work piece and said one or more projection weld nuts from a first side of said work piece;
    affixing one or more second contacting electrodes to one or more electrode mounting members, said second contacting electrodes located separately from said work piece fixture and provided to transfer electric current to said work piece and said one or more projection weld nuts from a second side of said work piece;
    providing a resistance welding robot having a pair of gun arms each possessing a weld electrode, said gun arms adapted to simultaneously contact corresponding ones of said first and second contacting electrodes with said weld electrodes and to apply pressure against said projection weld nut and said work piece;
    loading said work piece to a work piece fixture;
    locating one or more projection weld nuts to said work piece; and
    transferring electric current from said welding robot weld electrodes to said one or more projection weld nuts and said work piece via contact between said welding robot weld electrodes and appropriate ones of said first and second contacting electrodes, thereby effecting welding of said one or more projection weld nuts to said work piece.

18. The method of claim 17, further comprising moving said work piece fixture into a welding position after being loaded with said work piece.

19. The method of claim 17, wherein said electrode support member is moveable.

20. The method of claim 17, further comprising providing one or more locating elements for properly locating said one or more projection weld nuts and/or said work piece.

21. The method of claim 17, wherein said one or more second contacting electrodes is adapted to be movably pressed against said one or more projection weld nuts or said work piece upon contact by a welding robot weld electrode.

* * * * *